R. D. MADDOX.
PROTRACTOR.
APPLICATION FILED OCT. 19, 1918.
1,292,957.
Patented Jan. 28, 1919.
3 SHEETS—SHEET 1
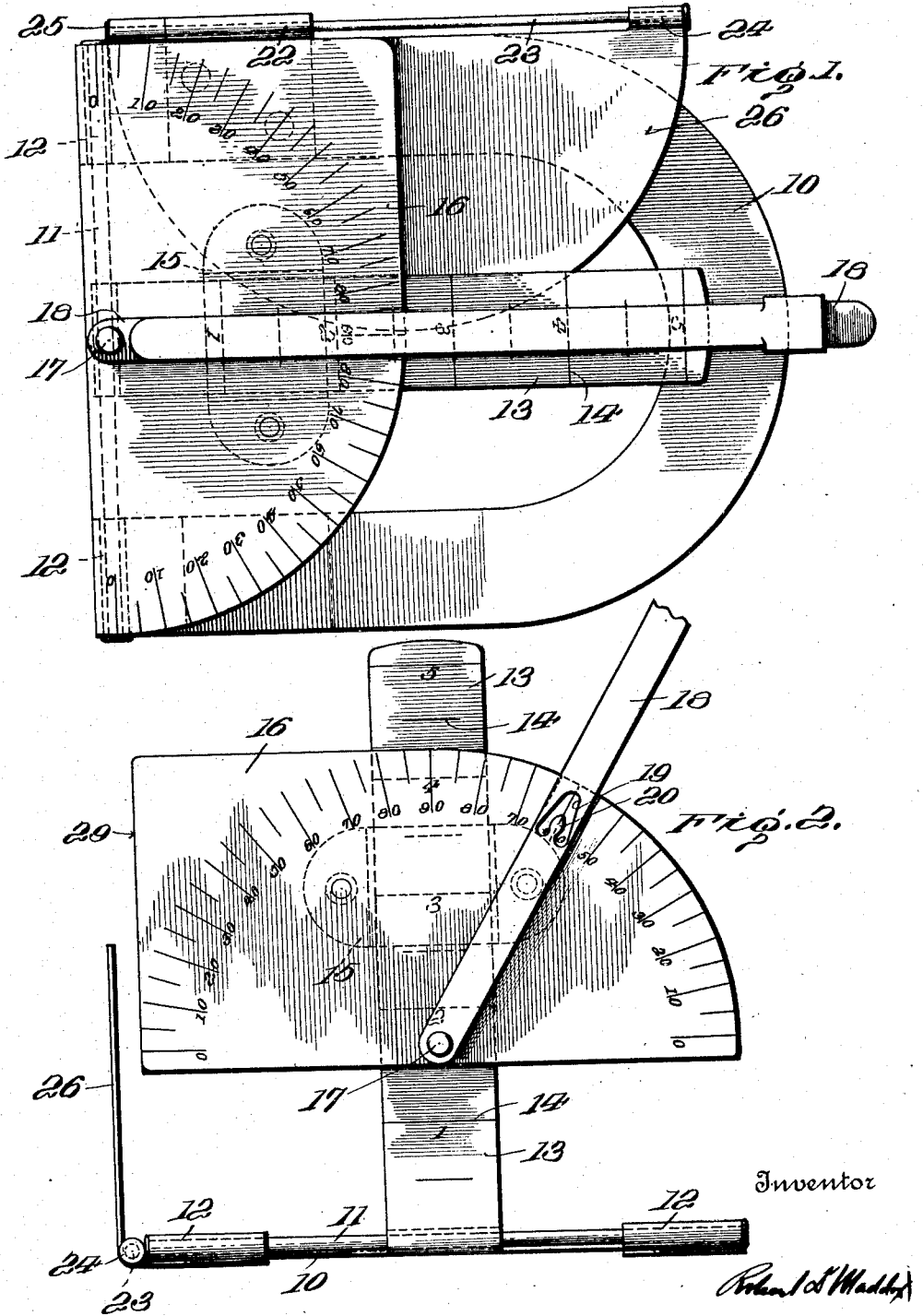

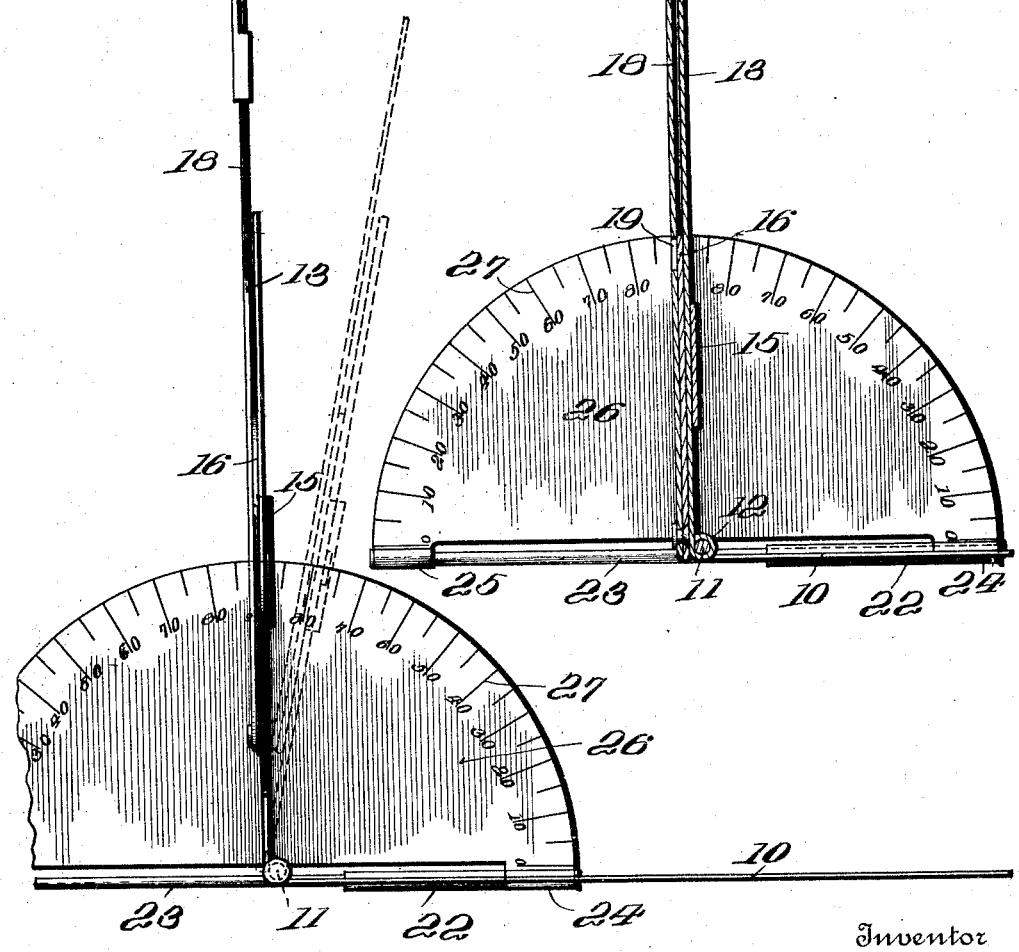

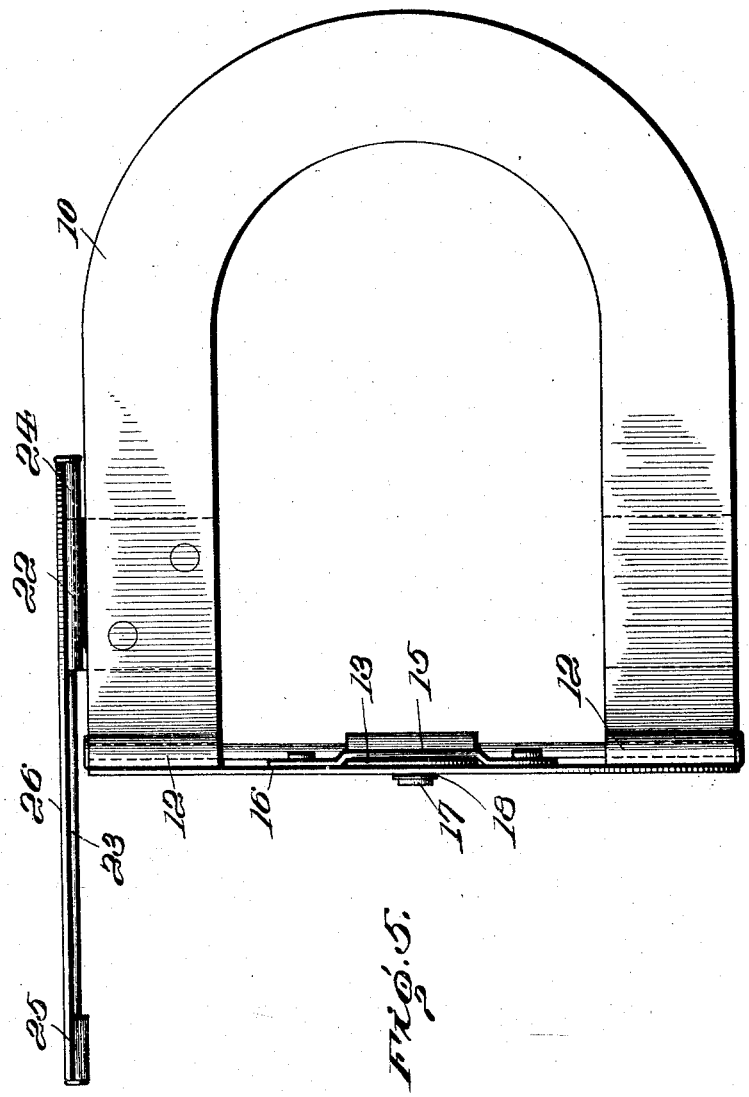

UNITED STATES PATENT OFFICE.

ROBERT D. MADDOX, OF THE UNITED STATES ARMY.

PROTRACTOR.

1,292,957.  Specification of Letters Patent.  Patented Jan. 28, 1919.

Application filed October 19, 1918. Serial No. 258,871.

(FILED UNDER THE ACT OF MARCH 3, 1883, 22 STAT. L., 625.)

*To all whom it may concern:*

Be it known that I, ROBERT DANIEL MADDOX, major, Medical Dept., U. S. Army, a citizen of the United States, stationed at Washington, D. C., have invented an Improvement in Protractors, of which the following is a specification.

The invention described herein may be used by the Government, or any of its officers or employees in prosecution of work for the Government, or by any other person in the United States, without payment of any royalty thereon.

This invention relates to instruments of the protractor type for measuring angles, and has for one of its objects to improve the construction, increase the efficiency and enlarge the scope of devices of this character.

The improved instrument is designed for use in determining the angles between two or more members, for instance, those made from structural steel, and includes means for determining the relative angles extending in a plurality of directions.

The improved instrument likewise includes means whereby the parts may be collapsed or folded when not in use, to facilitate transportation, or storage, or to enable the instrument to be deposited in a casing or instrument box.

In the drawings illustrative of the preferred embodiment of the invention—

Figure 1 is a view of the improved instrument with the parts collapsed or folded.

Fig. 2 is a front view with the parts arranged for illustrating one use of the instrument.

Fig. 3 is a side view with the parts arranged as in Fig. 2.

Fig. 4 is a side view with the parts in section; and

Fig. 5 is a plan view with the parts arranged as in Fig. 3.

The improved instrument comprises a base or body member 10, preferably in U shape. At one end the base member is provided with a pintle or rod 11, and when the base is in U shape the terminals of the base will be formed with sockets 12 to rotatively support the pintle.

Attached to the pintle 11 and movable therewith is a flat bar 13 suitably graduated as indicated at 14.

Slidable upon the bar 13 by a clip 15 is a plate 16, and pivoted at 17 to the plate is an arm 18 of any required length, the arm 18 being provided with an aperture 19 having a pointer or finger 20 therein.

The plate 16 is provided with radial graduations representing the degrees of a circle as shown in Figs. 1 and 2, and the finger 20 operates over the graduations and indicates the position of the bar 18 in degrees relative to the plate 16.

The bar 18 may be of any required length, but is preferably provided with a slidable extension 21, which may be reversed in position upon the bar 18, as shown in Fig. 1, when the parts are collapsed or folded.

Attached to the base 10 at one side is a combined guide and bearing 22 through which a rod 23 is slidably disposed.

Attached to the ends of the rod 23 by bearings 24—25 is a plate 26 having segmentally arranged degree graduations indicated at 27. The central point of the graduations of the plate 26 is in alinement with the graduated face of the plate 16 when the plate 16 is so disposed that its bearing 24 bears against the combined bearing and guide 22, as shown in Figs. 3 and 5. By this means the adjacent edge of the plate 16 coacts with the graduations of the plate 26. The combined bearing and guide 22 is so disposed upon the base 10 that when the member 23 is moved to the limit of its movement in one direction, the bearing 24 will engage the bearing 22, the two bearings thus coacting to correctly position the plate 26 relatively to the plate 16.

The various plates and bars are constructed of metal as light as possible consistent with the strains to which they will be subjected when in use, and will be plated, galvanized or otherwise ornamented and protected from corrosion.

In using the improved instrument the plate 26 is adjusted along the rod 23 until the bearing 24 engages the bearing 22 and the plate 26 at right angles to the line of the base 10. The instrument is then arranged with the base 10 against one of the members of the structure and the bar 13 adjusted until the plate 16 and the denoting bar 18 bears against an adjacent portion of the structure. This latter arrangement will locate the end 29 of the plate 16 relatively near the graduations 27 on the plate and denote the relative angles between the bar 18 and its extension, and correspondingly denote the relative angles of the two bodies or members. At the same time the plate 16 may be adjusted upon the bar 13 to a sufficient extent to enable the bar 18 to be adjusted over the graduations of the plate 16 to denote the angularity in a direction at right angles to the angularity between the plate 16 and the base 10.

When not in use the implement can be collapsed or folded to occupy relatively small space for depositing in a casing or instrument box.

Having thus described the invention what is desired to secure by Letters Patent is:

1. An instrument of the class described comprising a body member, a graduated bar mounted to swing upon said body, a combined guide and bearing upon said body at right angles to the bar, a plate having degree graduations and including a rod slidably and rotatively engaging said guide and bearing, and another plate movable on said bar and coacting with the degree graduations of said first mentioned plate.

2. An instrument of the class described comprising a body member, a graduated bar mounted to swing upon said body, a plate having degree graduations and adapted to be supported upon said base at right angles to the line of movement of said bar, and another plate movable on said bar and coacting with the degree graduation of said first mentioned plate.

3. An instrument of the class described comprising a body member including right angled edges, a plate having degree graduations hingedly united to said body at one of its right angled edges, and another plate swinging from said body at the other of its right angled edges, and coacting with the degree graduations of the said first mentioned plate.

4. An instrument of the class described comprising a body member, a plate having degree graduations and slidably and foldably engaging said body, and another plate swinging relatively to said body and coacting with the degree graduations of the first mentioned plate.

5. An instrument of the class described comprising a body member, a plate having degree graduations and slidably and foldably engaging said body, a bar swinging upon said body at right angles to the plate, another plate having degree graduations and adjustable upon said bar and coacting with the degree graduations of the first mentioned plate, and an arm swinging relatively to said adjustable plate and coacting with the graduations of the same.

6. An instrument of the class described comprising a body member including right angled edges, a plate having degree graduations and hingedly united to said body at one of its right angled edges, and another plate swinging from said body at another of its right angled edges and movable longitudinally thereof and coacting with the degree graduations of said first mentioned plate.

7. An instrument of the class described comprising a body member, a plate carried by said body and having graduations denoting the degrees of a circle, another plate swinging relatively to said body and provided with graduations denoting the degrees of a circle, and an arm swinging relatively to said adjustable plate and coacting with the graduations of the same.

8. An instrument of the class described comprising a body member in U shape with bearings at its terminals, a rod mounted for rotation in said bearings, a bar connected to swing with said rod, a combined guide and bearing carried by said body at right angles to the axial line of the rod, a plate having degree graduations and provided with a supporting rod slidably engaging guide bearing, and another plate movable on said bar and coacting with the degree graduations of the first mentioned plate.

9. An instrument of the class described comprising a body member in U shape with bearings at its terminals, a rod mounted for rotation in said bearings, a bar connected to swing with said rod, a combined guide and bearing carried by said body at right angles to the axial line of the rod, a plate having degree graduations and provided with a supporting rod slidably engaging said guide and bearing, another plate movable on said bar and coacting with the degree graduations of the first mentioned plate, and an arm swinging relatively to said adjustable plate and coacting with the graduations of the same.

10. An instrument of the class described comprising a body member, a plate having degree graduations and foldable relatively to said body, a bar swinging relatively to said body at right angles to said plate, another plate having degree graduations adjustable upon said bar and coacting with the graduations of the first mentioned plate, an arm swinging relatively to said adjustable plate and coacting with the graduations of the same, and an extension arm reversibly and slidably engaging the swinging arm.

ROBERT D. MADDOX.

Copies of this patent may be obtained for five cents each, by addressing the "Commissioner of Patents, Washington, D. C."